Patented Aug. 7, 1951

2,563,070

UNITED STATES PATENT OFFICE 2,563,070

ANTIDIABETIC

Richard G. Roberts, Chicago, Ill., assignor to The Chicago Medical School, a corporation of Illinois No Drawing. Application December 19, 1947, Serial No. 792,863

8 Claims. (Cl. 167—75)

This invention relates to an antidiabetic, and more specifically to a modified insulin of prolonged effect upon the blood sugar content of the patient.

Since the isolation of insulin, approximately twenty-five years ago, various modifications have been attempted to alter its rate of absorption or to prolong its action, as shown by the blood sugar curve of the patient. For instance there has been injected with insulin some substance, as adrenaline, to influence circulation by vasoconstriction at the site of the injection. The effect of this modification is to delay, rather than to prolong the insulin absorption. When the spasm of the blood vessels is relaxed, a very high rate of absorption sets in.

A second modification has been the injection of dry insulin in an oil suspension. This expedient has not been found of practical value. Nodules of oil remain under the skin for some time after the injection.

A third modification consists in giving the insulin together with a substance with which it forms a composition relatively insoluble in the tissue fluids, as protein-precipitating agents, for example, protamine. With ordinary insulin, injections are required about every six hours to prevent a marked rise in the sugar content of the blood. With protamine insulin there is a considerable prolongation of effect. But the protamine and other protein insulins are subject to the serious disadvantage that many patients are not tolerant of a foreign protein factor.

It is the object of my invention to provide a compound of insulin with other substances found in body tissue in order to prolong the effect of the injection, delay a rise in blood sugar, prevent hyperglycemia, and at the same time obviating any intolerant reaction. My invention so modifies insulin that its action is greatly prolonged. Instead of repeated injections daily, the modified insulin of this invention maintains its effect for twenty-four hours, or even longer.

It is a further object of my invention to provide insulin modifications or compounds which can be used for subcutaneous injection with such vehicles as water, glycols, glycerols or triacetin, and which insulin modifications do not contain any foreign protein.

In general my invention consists of a compound of insulin combined with choline or a salt of choline, or insulin combined with choline (or a salt thereof) and hemin (proto iron porphyrin). The exact constitution of such combined products is not certainly known; but I conceive them to be molecular compounds, somewhat analogous to such organic salts as amine hydrochlorides. However, I do not wish to be bound to any particular theory with respect to the formation.

Spectrophotometric analyses of my product indicate that it is of the nature of a chemical compound and not of the nature of a chemical mixture. Commonly such a product is referred to as a coordinate. Since there remains a minute amount of the solvent or dispersing medium employed in preparing the product, which solvent may be anhydrous liquid ammonia, I designate my new product as an ammono compound of choline, insulin, and hemin.

A most important advantage inherent in my modified insulin is that the effect of administration is greatly prolonged without any concomitant danger of a foreign protein reaction. For example, rabbits injected subcutaneously with the modified insulin of the present invention show a lowered blood sugar content which lasts for as long as thirty-four hours. The same quantity of pure insulin produces an effect lasting for only six hours; and protamine or globin insulin, only twelve hours. No evidence of toxic reactions was shown by the rabbits at the time of or for several hours after the injection. When the same identical rabbits were given a comparable injection after a period of two weeks there was no evidence of an anaphylactic reaction.

The products which are the subject of this invention are prepared by mixing suitable proportions of (1) insulin and choline, (2) insulin and a salt of choline; (3) insulin, choline, and hemin, or (4) insulin, a salt of choline and hemin in a suitable solvent such as anhydrous liquid ammonia, hydrazine, methyl amine, or ethyl amine; and allowing the solvent to boil off upon completion of the reaction. If desired the last traces of the free solvent can be removed by application of a vacuum.

The modified insulin of my invention may be prepared in accordance with the following examples:

Example 1

20 mgms. of crystalline insulin, 20 mgms. of crystalline hemin and 80 mgms. of crystalline choline dihydrogen citrate were mixed and reacted in 100 cc. of anhydrous liquid ammonia. The product is a reddish-brown amorphous powder soluble in water or glycerol or ethylene glycol or propylene glycol.

Example 2

20 mgms. of crystalline insulin, 20 mgms. of crystalline hemin and 40 mgms. of crystalline choline chloride were mixed and reacted in 100 cc. of anhydrous liquid ammonia. The product is a reddish brown amorphous powder soluble in water or glycerol or ethylene glycol or propylene glycol.

Example 3

20 mgms. of crystalline insulin, 20 mgms. of crystalline hemin and 35 mgms. of choline were mixed and reacted in 100 cc. of anhydrous liquid ammonia. The product is a reddish brown amorphous powder soluble in water or glycerol or ethylene glycol or propylene glycol.

Example 4

20 mgms. of crystalline insulin and 80 mgms. of crystalline choline dihydrogen citrate were mixed and reacted to 100 cc. of anhydous liquid ammonia. The product is a creamy-white amorphous powder soluble in water or glycol or ethylene glycol or propylene glycol.

Example 5

20 mgms. of crystalline insulin, and 35 mgms. of choline were mixed and reacted in 100 cc. of anhydrous liquid ammonia. The product is a creamy-white amorphous powder soluble in water or glycerol or ethylene glycol or propylene glycol.

The solution of my modified insulin may be purified in a suitable manner, as by filtration through a Seitz or Berkefeld filter.

The insulin employed may be crystalline or amorphous, though I prefer the former. The choline must be of a type operable to supply choline to body fluids. The reactive proportions of the insulin, choline, and hemin and of the solvent may be varied. I prefer to use 20 mgms. of insulin, 20 mgms. of hemin, and 40 mgms. of choline chloride, or proportional equivalents.

An excess of insulin or of choline salts or of hemin does no harm since in that case the final product is composed of a mixture of the component that is in execess and the ammono coordinate. The presence of the ammono cordinate prolongs the effect of the insulin; and I can in consequence deliberately prepare mixtures of insulin and the ammono coordinate. Neither hemin nor choline salts in excess have any harmful synergistic action between themselves or with the ammono compound.

The components of the examples given, including the solvent, are introduced into glass Dewar flasks at one atmosphere of pressure and at the temperature of the solvent, minus 33.4° C. in the case of liquid ammonia. Moisture and atmosphere are excluded from the reaction products by permitting the solvent to evaporate spontaneously through a mercury seal. The solvent gas remaining in the flask may be removed by vacuum. The modified insulin may be prepared in metal containers and at pressures above or below one atmosphere and at temperatures above or below the boiling point of the solvent.

The product of the reaction may be dissolved for injection purposes in water, glycerol, ethylene glycol, or propylene glycol.

Either in the powder form resulting from the reaction and the solvent evaporation, or in dissolved form for injection, my modified insulin is stable under ordinary conditions. Administration is by injection as with ordinary forms of insulin.

I claim as my invention:

1. A therapeutic agent for use in the treatment of diabetes comprising a compound of insulin, choline, and hemin, that is substantially free from uncombined choline.

2. A therapeutic agent for use in the treatment of diabetes comprising a compound of insulin, a salt of choline, and hemin, in which the amount of salt of choline is no greater than the combined amounts of insulin and hemin.

3. A therapeutic agent for use in the treatment of diabetes comprising a compound of insulin, a choline addition compound, and hemin.

4. A therapeutic agent for use in the treatment of diabetes comprising a compound of insulin, choline chloride, and hemin, in which the quantity of choline chloride is limited to the amount that can be completely compounded with the other ingredients to leave no free choline chloride mixed in with the compound.

5. An ammono compound of insulin, hemin, and choline, containing no free choline.

6. Insulin modified by compounding with hemin and choline, in a solvent to form a compound that is substantially free from uncombined choline.

7. A water soluble amorphous powder for subcutaneous injection with a liquid carrier as an antidiabetic comprising: a compound of insulin, hemin and choline chloride reacted in anhydrous liquid ammonia, in which the amounts of hemin and choline are restricted to leave no free choline in the compound.

8. A water soluble amorphous powder for subcutaneous injection with a liquid carrier as an antidiabetic comprising: 20 parts of crystalline insulin, 20 parts crystalline hemin, and 40 parts choline chloride reacted with 100 cc. anhydrous liquid ammonia.

RICHARD G. ROBERTS.

REFERENCES CITED

The following references are of record in the file of this patent:

UNITED STATES PATENTS

| Number | Name | Date |
|---|---|---|
| 1,866,569 | Kharasch | July 12, 1932 |

OTHER REFERENCES

Joslin: "Treatment of Diabetes Today," in J. A. M. A., June 18, 1949, page 583.

Barnard in J. Lab. Clin. Med. 27, March 1942, pages 774–777; abstract in Squibb Abstracts, vol. 15, May 27, 1942, page A-709.

Reiner et al.: in Quarterly J. Pharmacy and Pharmacology, April–June 1942, pages 175, 176.

Jensen: "Insulin," 1938, page 98.

Mitchell: "A Textbook of Biochemistry," 1946, pp. 72, 73, 416.